(12) United States Patent
Breen

(10) Patent No.: US 6,313,367 B1
(45) Date of Patent: Nov. 6, 2001

(54) INHIBITION OF ASPHALTENE DEPOSITION IN CRUDE OIL PRODUCTION SYSTEMS

(75) Inventor: Patrick J. Breen, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 09/491,206

(22) Filed: Jan. 25, 2000

Related U.S. Application Data

(60) Provisional application No. 60/121,298, filed on Feb. 22, 1999.

(51) Int. Cl.[7] ................................................ C10G 3/00
(52) U.S. Cl. ........................ 585/950; 208/22; 208/309
(58) Field of Search ................... 208/309, 22; 585/950

(56) References Cited

U.S. PATENT DOCUMENTS

| | | | |
|---|---|---|---|
| 3,902,557 | * | 9/1975 | Shaughnessy et al. ............ 166/295 |
| 4,021,335 | | 5/1977 | Beaton . |
| 4,207,193 | | 6/1980 | Ford et al. . |
| 5,021,498 | | 6/1991 | Stephenson et al. . |
| 5,039,432 | | 8/1991 | Ritter et al. . |
| 5,073,248 | | 12/1991 | Stepehnson et al. . |
| 5,100,531 | | 3/1992 | Stephenson et al. . |
| 5,143,594 | | 9/1992 | Stephenson et al. . |
| 5,504,063 | | 4/1996 | Becker et al. . |

FOREIGN PATENT DOCUMENTS

2076889 * 4/1997 (RU) .

OTHER PUBLICATIONS

Derwent WPI Abstract 83–53042K of JP 86002715, 1983.
European Patent Office Database Record of EP 217534 A2, Apr. 08, 1987.
European Patent Office Database Record of EP 256979 A1, Feb. 24, 1988.
European Patent Office Database Record of EP 258179 A1, Mar. 02, 1988.
European Patent Office Database Record of EP 461694 A1, Dec. 18, 1991.
C. L. Chang, et al., "Asphaltene Stabilization in Alkyl Solvents Using Oil–Soluble Amphiphiles," *SPE International Symposium on Oil–field Chemistry*, New Orleans, Mar. 2–5, 1993.
C. L. Chang, et al., "Stabilization of Asphaltenes in Aliphatic Solvents Using Alkylbenzene–Derived Amphiphiles. 1. Effect of the Chemical Structure of Amphiphiles on Asphaltene Stabilization," *Langmuir*, vol. 10, No. 6, 1994, pp. 1749–1757.
M. B. Manek, et al., "Asphaltene Dispersants as Demulsification Aids," *SPE International Symposium on Oilfield Chemistry*, San Antonio, Feb. 14–17, 1995.
Derwent WPI Abstract 95–168880 of S0 1706204, 1995.
P. F. Clarke, et al., "Asphaltene Precipitation: Detection Using Heat Transfer Analysis, and Inhibition Using Chemical Additives," *Fuel*, vol. 76, No. 7, 1997, pp. 607–614.

\* cited by examiner

*Primary Examiner*—Walter D. Griffin
*Assistant Examiner*—Tam M. Nguyen
(74) *Attorney, Agent, or Firm*—Madan, Mossman & Sriram P.C.

(57) ABSTRACT

It has been discovered that various ester and ether reaction products are excellent asphaltene deposition inhibitors or dispersants for use in hydrocarbons such as crude oils. The asphaltene inhibiting compounds may be (1) esters formed from the reaction of polyhydric alcohols with carboxylic acids; (2) ethers formed from the reaction of glycidyl ethers or epoxides with polyhydric alcohols; and (3) esters formed from the reaction of glycidyl ethers or epoxides with carboxylic acids.

12 Claims, No Drawings

INHIBITION OF ASPHALTENE DEPOSITION IN CRUDE OIL PRODUCTION SYSTEMS

This application claims the benefit of U.S. Provisional Application No. 60/121,298 filed Feb. 22, 1999.

FIELD OF THE INVENTION

The present invention relates to methods and compositions for inhibiting asphaltene deposition in hydrocarbon fluids, and more particularly relates, in one embodiment, to methods and compositions for inhibiting asphaltene deposition in crude oil using ester and ether compounds.

BACKGROUND OF THE INVENTION

Asphaltenes are most commonly defined as that portion of crude oil which is insoluble in heptane. Asphaltenes exist in the form of colloidal dispersions stabilized by other components in the crude oil. They are the most polar fraction of crude oil, and often will precipitate upon pressure, temperature, and compositional changes in the oil resulting from blending or other mechanical or physicochemical processing. Asphaltene precipitation occurs in pipelines, separators, and other equipment. Once deposited, asphaltenes present numerous problems for crude oil producers. For example, asphaltene deposits can plug downhole tubulars, well-bores, choke off pipes and interfere with the functioning of separator equipment.

It would thus be desirable to develop a composition and method employing it which would inhibit or prevent asphaltene deposition.

SUMMARY OF THE INVENTION

Accordingly, it is an object of the present invention to provide ester and ether reaction products which can inhibit or prevent asphaltene deposition and methods for using them.

It is another object of the present invention to provide a family of ester and ether compounds useful in inhibiting asphaltene deposition in crude oil.

In carrying out these and other objects of the invention, there is provided, in one form, a method of inhibiting asphaltene deposition in crude oil comprising adding to the crude oil an effective asphaltene inhibiting amount of an asphaltene inhibiting compound. The asphaltene inhibiting compounds may be (1) esters formed from the reaction of polyhydric alcohols with carboxylic acids; (2) ethers formed from the reaction of fatty glycidyl ethers or fatty epoxides with polyhydric alcohols; and (3) esters formed from the reaction of fatty glycidyl ethers or fatty epoxides with carboxylic acids.

DETAILED DESCRIPTION OF THE INVENTION

It has been discovered that various ester and ether reaction products are excellent asphaltene deposition inhibitors or dispersants for use in crude oils.

The invention specifically relates, in one embodiment, to the use of esters of polyhydric alcohols with fatty long-chain acids and linear or branched alkane and alkene acids. The polyhydric alcohols may have from about 2 to hundreds of carbon atoms, more preferably from about 2 to about 100 carbon atoms, and most preferably have from about 6 to about 50 carbon atoms. More specifically, suitable polyhydric alcohols include, but are not necessarily limited to, glycerol, sorbitol, and polyglycerols.

The carboxylic acids suitable for reacting in this invention may have from about 10 to about 30 or more carbon atoms, more preferably from about 12 to about 28 carbon atoms, and most preferably have from about 16 to about 22 carbon atoms. The suitable fatty long-chain acids include, but are not necessarily limited to, oleic acid, but also include tall-oil fatty acid, vegetable fatty acids (e.g. soya fatty acid, canola fatty acid, etc.), animal fatty acid (e.g. tallow fatty acid, etc.) and the like. Oleic acid is a particularly preferred carboxylic acid herein. In one embodiment of the invention, $C_{6-24}$ linear or branched (e.g. isostearic acid) alkane and alkene (conjugated or non-conjugated acids) may be employed.

More specifically, in the case of glycerol and a monocarboxylic acid, the mono-, di- or tri-esters can be formed. That is, if a mono-ester is formed, then two hydroxyl groups of glycerol will remain unreacted. Mono-esters of glycerol and other alcohols are considered to be within the scope of this invention. Thus, monoesters and polyesters (reaction products having only one ester group or having more than one ester group, respectively) and monoethers and polyethers (reaction products having only one ether group or having more than one ether group, respectively) are within the scope of this invention.

In another non-limiting aspect of this invention, polyhydric alcohols are reacted with fatty glycidyl ethers or fatty epoxides, instead of carboxylic acids. Consequently, the polyhydric alcohols react with the epoxy group to form a new ether linkage with a pendant alcohol group on the beta carbon. The mole ratio of the total alcohols to total epoxide groups can be varied such that partial or total etherification of the hydroxyl groups will occur. Suitable polyhydric alcohols are as discussed above. The glycidyl ethers or epoxides suitable for reacting in this invention may have from about 10 to about 30 or more carbon atoms, more preferably from about 12 to about 28 carbon atoms, and most preferably have from about 16 to about 22 carbon atoms. Within the scope of this invention, glycidyl ethers are understood to encompass polyglycidyl ethers, and epoxides encompasses polyepoxides.

Alternatively, in another non-limiting aspect of this invention, the carboxylic acids may be reacted with glycidyl ethers or epoxides instead of the polyhydric alcohols. In this embodiment, the carboxylic acids will react with the glycidyl ether (e.g. glycerol triglycidyl ether) or epoxide to form an ester linkage and a pendant alcohol group on the beta carbon. Again, one can vary the mole ratio of total epoxide groups to the total carboxylic groups such that partial or total esterification will occur. Suitable glycidyl ethers or epoxides for use in this embodiment are the same as those discussed above for the previous embodiment.

In another non-limiting embodiment of the invention, the asphaltene inhibiting compound averages from 4 to 6 ester groups or 4 to 6 ether groups. Further, the asphaltene inhibiting compound is selected from the group consisting of decaglycerol tetraoleate and sorbitan mono-oleate.

In one embodiment of the invention, the asphaltene inhibitor is employed in the absence of an added amine base. Further, the inventive asphaltene inhibitor is used in the absence of added free carboxylic acids and/or an added fluorochemical compound, in other embodiments. In additional embodiments of the invention, the asphaltene inhibitor of the invention is used in the absence of an added liquid paraffinic solvent or other added hydrocarbon solvent.

The effective ester and ether compounds useful as asphaltene deposition inhibitors will typically be diluted in a hydrocarbon solvent. Examples of suitable solvents include, but are not necessarily limited to, toluene, xylene, aromatic naphtha and the like.

The best asphaltene deposition inhibitor is research product RP-A, which is a dilution in a solvent of decaglycerol tetraoleate, which is obtained by reacting decaglycerol with four equivalents of oleic acid. RP-A was developed from the initial discovery that sorbitan mono-oleate was a good asphaltene inhibitor. This component was the active component of RP-B. Other oleates and esters have been investigated and are listed below with their respective performance results.

Application of the asphaltene inhibitor according to the method herein may be by continuous or batch injection into the oil pipeline, well or header system, or other equipment. It will be appreciated that there are a number of complex and interrelated factors which would determine the range of dosage of asphaltene inhibitor in a particular hydrocarbon stream, including, but not necessarily limited to, the chemical composition of the hydrocarbon or crude oil, the temperature and pressure of the stream and the nature of any mechanical or physicochemical process the stream will be subjected to. The latter includes, but is not limited to, depressurization, cooling or heating, mixing with other produced fluids, shearing, the use of other additives such as acid, and the like. While it is impossible to generalize about dosage levels because of these complex factors, it will be appreciated that in one non-limiting example, the proportion of asphaltene deposition inhibitor used in a hydrocarbon stream may be at least 25 ppm, preferably from about 100 to about 500 ppm, and most preferably from about 200 to about 250 ppm.

The invention will be further described with reference to the following specific examples, which are not meant to limit the invention, but rather to further illustrate it.

Spectroscopic Method for Evaluation of Asphaltene Dispersants

In this research, it was demonstrated that UV absorption at 325 nm was an effective means of quantifying asphaltenes. This test method was used to evaluate 32 different polymers as asphaltene dispersants. Toluene was found not to interfere at 325 nm. The calibration plot was linear when absorbance was less than 3.0.

Materials Needed:
1) UV spectrophotometer with quartz UV absorbance cell
2) Centrifuge and 15 ml screw cap centrifuge tubes
3) Microliter syringes—50 $\mu$l, 100 $\mu$l
4) 10 ml pipet
5) Electronic balance
6) UV grade toluene and hexane Procedure:
1. Prepare a 10% weight stock solution of the asphaltenes in toluene. Allow the solution to equilibrate overnight to ensure total dissolution.
2. Pipet 10 ml of hexane into a centrifuge tube for each sample to be tested. Also pipet 10 ml of hexane into a centrifuge tube and treat as a blank (no additive). To test at 400 ppm of inhibitor, inject 4 $\mu$l of a 10%-in-toluene solution of each dispersant into the hexane, cap and shake.
3. After all the dispersants have been injected, inject 100 $\mu$l of the asphaltene solution into each tube including the blank (this gives an asphaltene concentration of about 1000 ppm). Cap and shake each tube 20 times, then allow the tubes to sit undisturbed for 90 minutes.
4. After the 90 minutes has elapsed, centrifuge the tubes for 5 minutes. Remove a portion of the supernatant fluid from each tube and dilute in four parts of toluene (a five-fold dilution).
5. Prepare a series of calibration standards (10, 25, 50, 75, 100, 150, 200 ppm) in toluene using the 10% asphaltene stock solution.
6. Set the blank absorbance at 325 nm in the UV absorption photometer using pure toluene. The spectrophotometer will automatically subtract the absorbance of this blank from subsequent measurements.
7. Measure the absorbance of each calibration standard, and each sample in the spectrophotometer at 325 nm. Interference from most aromatics, including toluene is minimal at 325 nm.
8. The absorbance for the calibration standards are graphed and fit to a straight line (ppm v. $Abs_{325}$) from which the ppm of asphaltene in the samples can be obtained. Multiply this number by the dilution factor of five to obtain the true concentration, in ppm, of asphaltenes.
9. Percent inhibition can be calculated from the following formula:

$$\% I = \frac{(\text{ppm asph in sample}) - (\text{ppm asph in blank})}{1000 \text{ ppm} - (\text{ppm asph in blank})} \times 100$$

Examples 1–21

Table I lists the calculated percent inhibitions found for a variety of polymers. Asphaltenes used in Examples 1–21 were found as a deposit in an offshore oil and gas separator vessel. Analysis proved these deposits to be composed primarily of asphaltenes, and they were used without additional purification.

Most products tested yielded close to zero inhibition. Significant activity was observed for RP-F, RP-O, RP-H, RP-C and RP-J. Most of the polymers were ester products of reactions of maleic anhydride with alpha-olefins.

TABLE I

Performance Test Results

| Ex. | Research Product | Compound | % Inhibition at 400 ppm |
|---|---|---|---|
| 1 | RP-C | polymaleic α-olefin copolymer amide with monoethanol amine | 48.1 |
| 2 | RP-D | polymaleic α-olefin copolymer amide with monoethanol amide | 26.8 |
| 3 | RP-E | polymaleic ester with $C_{10-12}$ alcohol | 8.7 |
| 4 | RP-F | polymaleic butadiene copolymer ester | 100.00 |
| 5 | RP-G | polymaleic $C_{12}$ α-olefin copolymer ester with monoethanol amine | −0.3 |
| 6 | RP-H | sorbitan mono-oleate | 71.8 |
| 7 | RP-I | ethoxylated propoxylated nonylphenol formaldehyde resin | 2.3 |
| 8 | RP-J | polymaleic α-olefin copolymer ester | 36.3 |
| 9 | RP-K | phenol-formaldehyde polymer resin | 22.6 |
| 10 | RP-L | propoxylated phenol formaldehyde resin | 1.1 |
| 11 | RP-M | " | 1.3 |
| 12 | RP-N | " | 2.0 |
| 13 | RP-O | polymaleic α-olefin copolymer ester with $C_{18-22}$ alcohol | 72.5 |
| 14 | RP-P | dodecyl benzene sulfonic acid, 50% in toluene | −9.1 |

TABLE I-continued

Performance Test Results

| Ex. | Research Product | Compound | % Inhibition at 400 ppm |
|---|---|---|---|
| 15 | RP-Q | ethoxylated, propoxylated polyol diepoxide | 2.1 |
| 16 | RP-R | ethoxylated phenol-formaldehyde resin | 2.4 |
| 17 | RP-S | propoxylated phenol | 5.7 |
| 18 | RP-T | ethoxylated, propoxylated polyester | −0.9 |
| 19 | RP-U | ethoxylated sorbitan ester with TOFA | 2.7 |
| 20 | RP-V | ethoxylated phenol formaldehyde resin | 2.7 |
| 21 | RP-W | dimethylaminopropylamine amide with adipic acid | 8.1 |

Asphaltene Acquisition

Pentane (700 ml) was added to 300 ml of crude oil from an offshore platform. The mixture was allowed to stand 30 minutes, then centrifuged. The supernatant was poured off, and the hard asphaltic plug in the bottom was removed and dried in an oven to obtain the asphaltene used below.

The asphaltene inhibitor performance test described above was again employed. Results are shown in Table II.

TABLE II

Performance Test Results

| Ex. | Research Product | Compound | % Inhibition at 400 ppm |
|---|---|---|---|
| 22 | RP-X | Commercially sold asphaltene inhibitor | 7.1 |
| 23 | RP-A | Sorbitan mono-oleate | 26.8 |
| 24 | RP-Y | Maleic anhydride styrene copolymer ester | 9.0 |
| 25 | RP-Z | " | 8.5 |
| 26 | RP-AA | " | 9.0 |

Asphaltene Testing Procedure for Examples 27–82

1. To 10 ml of hexane, add 4 μl of the asphaltene inhibitor to be evaluated, and mix thoroughly. Also prepare 10 ml of hexane to which nothing has been added.
2. Add 100 μl of a designated asphaltic crude oil to the hexane mixture and again mix thoroughly (10,000 ppm).
3. Allow the samples to remain undisturbed for 45 minutes, then centrifuge for 5 minutes. Remove 1 ml of supernatant from each sample and dilute in 4 ml of toluene.
4. Prepare a set of calibration standards for the oil in toluene covering the 5 range from 0 to 2,000 ppm. The concentrations can be corrected to reflect the % asphaltenes in the oil.
5. Measure the absorbance of each of the diluted samples at 440 nm, and use the calibration curve to calculate concentration of oil, asphaltenes and percent inhibition.

Examples 27–82

For the Examples listed below, a crude oil from deepwater Gulf of Mexico was used. The oil was 5.96% asphaltenes, so 10,000 ppm of oil corresponded to 596 ppm of asphaltene, equaling 100% inhibition. The untreated blank was found to contain 296 ppm of asphaltene, corresponding to 0% inhibition.

TABLE III

| Ex. | | Absorbance at 440 nm | ppm Asphaltene | % Inhibition |
|---|---|---|---|---|
| | Acid | | | |
| 27 | Blank | 0.9219 | 297.2 | 0.4 |
| 28 | Blank | 0.9216 | 297.1 | 0.4 |
| 29 | Blank | 0.9283 | 299.3 | 1.1 |
| 30 | Blank | 0.9183 | 295.9 | −2.1 |
| 31 | Hexanoic | 0.9534 | 307.8 | 3.9 |
| 32 | Hexanoic | 0.9345 | 301.4 | 1.8 |
| 33 | Hexanoic | 1.0069 | 325.9 | 10.0 |
| 34 | Hexanoic | 0.9172 | 295.6 | −0.1 |
| 35 | Hexanoic | 1.0069 | 325.9 | 10.0 |
| 36 | Hexanoic | 0.9171 | 295.5 | −0.1 |
| 37 | Heptanoic | 0.9454 | 305.1 | 3.0 |
| 38 | Heptanoic | 0.9165 | 295.3 | −0.2 |
| 39 | Heptanoic | 0.9359 | 301.9 | 2.0 |
| 40 | Heptanoic | 0.9779 | 316.1 | 6.7 |
| 41 | Octanoic | 0.9522 | 307.4 | 3.8 |
| 42 | Octanoic | 0.9251 | 298.2 | 0.7 |
| 43 | Octanoic | 0.9458 | 305.2 | 3.1 |
| 44 | Octanoic | 0.9611 | 310.4 | 4.8 |
| 45 | Decanoic | 0.9662 | 312.1 | 5.4 |
| 46 | Decanoic | 0.9878 | 319.4 | 7.8 |
| 47 | Decanoic | 0.9644 | 311.5 | 5.2 |
| 48 | Decanoic | 1.0035 | 324.8 | 9.6 |
| 49 | Lauric | 1.0539 | 341.8 | 15.3 |
| 50 | Lauric | 1.0312 | 334.1 | 12.7 |
| 51 | Lauric | 1.0400 | 337.1 | 13.7 |
| 52 | Lauric | 1.2224 | 398.8 | 34.3 |
| 53 | Myristic | 1.0589 | 343.5 | 15.8 |
| 54 | Myristic | 1.0181 | 329.7 | 11.2 |
| 55 | Myristic | 1.0758 | 349.2 | 17.7 |
| 56 | Myristic | 1.0705 | 347.4 | 17.1 |
| 57 | Palmitic | 1.0047 | 325.1 | 9.7 |
| 58 | Palmitic | 1.0067 | 325.8 | 9.9 |
| 59 | Palmitic | 0.9787 | 316.4 | 6.8 |
| 60 | Palmitic | 1.0233 | 331.5 | 11.8 |
| 61 | Palmitic | 1.0624 | 344.7 | 16.2 |
| 62 | Palmitic | 1.0498 | 340.4 | 14.8 |
| 63 | Oleic | 1.1184 | 363.6 | 22.5 |
| 64 | Oleic | 1.0944 | 355.5 | 19.8 |
| 65 | Oleic | 1.2158 | 396.6 | 33.5 |
| 66 | Oleic | 1.2451 | 406.5 | 36.8 |
| 67 | Oleic | 1.2413 | 405.2 | 36.4 |
| 68 | Oleic | 1.4485 | 475.3 | 59.8 |
| 69 | Oleic | 1.0570 | 342.9 | 15.6 |
| 70 | Oleic | 1.1554 | 376.1 | 26.7 |
| 71 | Oleic | 1.3757 | 450.7 | 51.6 |
| 72 | Oleic | 1.1984 | 390.7 | 31.6 |
| | Product | | | |
| 73 | Sorbitan mono-oleate | 0.9736 | 314.6 | 6.2 |
| 74 | Sorbitan mono-oleate | 1.0850 | 352.3 | 18.8 |
| 75 | Sorbitan monolaureate | 0.9968 | 322.5 | 8.8 |
| 76 | Sorbitan monolaureate | 0.9565 | 308.8 | 4.3 |
| 77 | Sorbitan monolaureate | 1.0961 | 356.0 | 20.0 |
| 78 | Sorbitan monolaureate | 1.0944 | 355.5 | 19.8 |
| 79 | Sorbitan monostearate | 1.0199 | 330.3 | 11.4 |
| 80 | Sorbitan monostearate | 0.9212 | 296.9 | 0.3 |
| 81 | Glycerol mono-oleate | 1.0042 | 325.0 | 9.7 |
| 82 | Glycerol mono-oleate | 0.9859 | 318.8 | 7.6 |

Examples 63–82 used the RP-A material.

In the foregoing specification, the invention has been described with reference to specific embodiments thereof, and has been demonstrated as effective in inhibiting asphaltene deposition in crude oil in bench scale testing, as non-limiting examples. However, it will be evident that various modifications and changes can be made thereto without departing from the broader spirit or scope of the invention as set forth in the appended claims. Accordingly, the specification is to be regarded in an illustrative rather than a restrictive sense. For example, specific ester and ether reaction products, and combinations thereof, other than those specifically tried, falling within the claimed parameters, but not specifically identified or tried in a particular application to inhibit asphaltenes, are within the scope of this invention. Similarly, it is expected that the inventive asphaltene inhibiting compositions will find utility as asphaltene inhibitors in other fluids besides crude oil. For instance, it is expected that the asphaltene inhibiting compositions and methods of this invention will be useful in inhibiting fouling in refineries, and in other applications where hydrocarbons containing asphaltenes are handled, used, or otherwise processed.

I claim:

1. A method of inhibiting asphaltene deposition in a hydrocarbon comprising adding to the hydrocarbon an effective asphaltene inhibiting amount of an asphaltene inhibiting compound selected from the group consisting of:

esters formed from the reaction of polyhydric alcohols with carboxylic acids;

ethers formed from the reaction of glycidyl ethers or epoxides with polyhydric alcohols; and esters formed from the reaction of glycidyl ethers or epoxides with carboxylic acids.

2. The method of claim 1 where the carboxylic acids are selected from the group consisting of fatty acids, alkane acids and alkene acids having from about 10 to about 30 carbon atoms.

3. The method of claim 1 where the polyhydric alcohols have from about 2 to about 50 carbon atoms.

4. The method of claim 1 where the glycidyl ethers or epoxides have from about 10 to about 30 carbon atoms.

5. The method of claim 1 where the asphaltene inhibiting compound averages from 4 to 6 ester or ether groups.

6. The method of claim 1 where the asphaltene inhibiting compound is the reaction product of a polyglycerol with oleic acid.

7. The method of claim 1 where the asphaltene inhibiting compound is selected from the group consisting of decaglycerol tetraoleate and sorbitan mono-oleate.

8. The method of claim 1 where the amount of asphaltene inhibiting compound in the hydrocarbon is at least 25 ppm.

9. The method of claim 1 where the hydrocarbon is crude oil.

10. The method of claim 1 practiced to inhibit fouling in a refinery.

11. A method of inhibiting asphaltene deposition in a hydrocarbon comprising adding to the hydrocarbon an effective asphaltene inhibiting amount at least 25 ppm, of an asphaltene inhibiting compound selected from the group consisting of:

esters formed from the reaction of polyhydric alcohols with carboxylic acids;

ethers formed from the reaction of glycidyl ethers or epoxides with polyhydric alcohols; and esters formed from the reaction of glycidyl ethers or epoxides with carboxylic acids;

where the carboxylic acids are selected from the group consisting of fatty adds, alkane acids and alkene acids having from about 10 to about 30 carbon atoms;

where the polyhydric alcohols have from about 2 to about 50 carbon atoms; and where the glycidyl ethers or epoxides have from about 10 to about 30 carbon atoms.

12. The method of claim 11 where the asphaltene inhibiting compound averages from 4 to 6 ester or ether groups.

* * * * *